US008997462B2

(12) United States Patent
Caine

(10) Patent No.: US 8,997,462 B2
(45) Date of Patent: Apr. 7, 2015

(54) METHOD AND APPARATUS FOR INJECTING HYDROGEN WITHIN AN ENGINE

(71) Applicant: Ford Global Technologies, LLC, Dearborn, MI (US)

(72) Inventor: Jonathan Edward Caine, South Woodham Ferrers (GB)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 13/851,005

(22) Filed: Mar. 26, 2013

(65) Prior Publication Data

US 2013/0247568 A1 Sep. 26, 2013

(30) Foreign Application Priority Data

Mar. 26, 2012 (GB) .................................. 1205221.3

(51) Int. Cl.
| | |
|---|---|
| *F01N 3/00* | (2006.01) |
| *F01N 3/10* | (2006.01) |
| *F01N 5/04* | (2006.01) |
| *F02B 33/44* | (2006.01) |
| *F02B 37/10* | (2006.01) |
| *F02B 37/20* | (2006.01) |

(52) U.S. Cl.
CPC ................. *F02B 37/10* (2013.01); *F02B 37/20* (2013.01); *Y02T 10/144* (2013.01)

(58) Field of Classification Search
CPC ...... F01N 3/2033; F02B 37/20; Y02T 10/144
USPC ........ 60/273, 280, 286, 303, 304, 605.1, 607, 60/608
See application file for complete search history.

(56) References Cited

U.S. PATENT DOCUMENTS 5,813,222 A 9/1998 Appleby
5,845,485 A 12/1998 Murphy et al.
(Continued)

FOREIGN PATENT DOCUMENTS

DE 102006037649 A1 2/2008
FR 2854652 A1 * 11/2004 .............. F02B 37/04
(Continued)

OTHER PUBLICATIONS

Caine, Jonathan Edward, "Method and Apparatus for Injecting Oxygen within an Engine," U.S. Appl. No. 13/851,000, filed Mar. 26, 2013, 34 pages.

*Primary Examiner* — Audrey K Bradley
(74) *Attorney, Agent, or Firm* — Julia Voutyras; Alleman Hall McCoy Russell & Tuttle LLP

(57) ABSTRACT

An engine system comprising: an exhaust gas system for removing exhaust gas from the engine; a turbocharger comprising a compressor for inducing air towards the engine and a turbine provided along the exhaust gas system and driven by removed exhaust gas for powering the compressor; a hydrogen delivery apparatus adapted to deliver hydrogen to the exhaust gas system such that the hydrogen can combust and expand, thereby increasing the speed of the turbine. The increased speed of the turbine operation decreases turbo lag and increases engine responsiveness.

17 Claims, 4 Drawing Sheets

(56) References Cited

U.S. PATENT DOCUMENTS 6,543,411 B2    4/2003   Raab et al.
2010/0043730 A1 2/2010   O'Bireck et al.
2011/0276204 A1* 11/2011 Shutty et al. .................. 701/22

FOREIGN PATENT DOCUMENTS

| JP | 2008280944 A | * | 11/2008 | .............. F02B 37/20 |
| WO | 2008142324 A1 | | 11/2008 | |
| WO | 2011002722 A1 | | 1/2011 | |

* cited by examiner

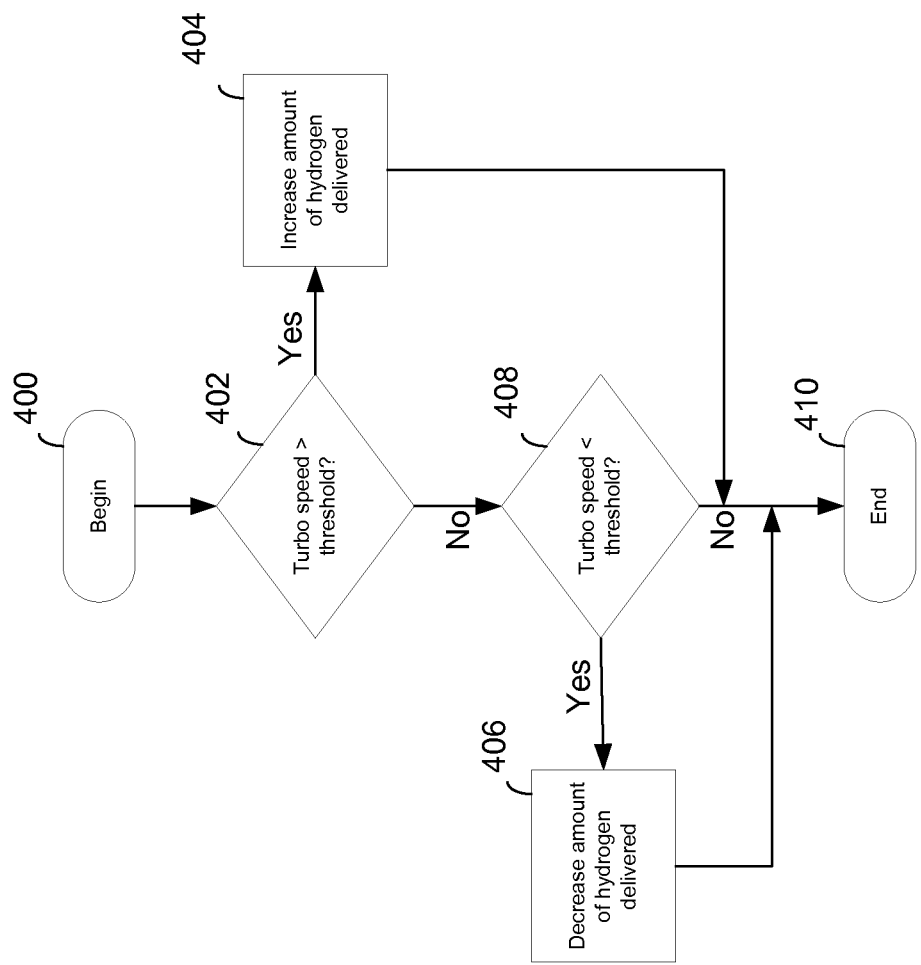

METHOD AND APPARATUS FOR INJECTING HYDROGEN WITHIN AN ENGINE

CROSS REFERENCE TO RELATED APPLICATIONS

The present application claims priority to United Kingdom Patent Application No. 1205221.3, filed on Mar. 26, 2012, the entire contents of which are hereby incorporated by reference for all purposes.

BACKGROUND AND SUMMARY

The present invention relates to a method and apparatus for injecting hydrogen within an engine. In particular, the invention relates to injecting hydrogen within an engine of a vehicle to increase the speed of a turbocharger.

In a turbocharged engine, a turbocharger may include a compressor to compress air intake from the atmosphere or an exhaust gas recirculation (EGR) system, to be delivered to the engine for combustion. By increasing the mass of air entering the engine, the expansive power of combusted energy is increased resulting in increased available torque and thus power and efficiency.

A compressor may be coupled to a high speed turbine within the exhaust system. A turbine may convert the kinetic energy and the potential energy from pressure into work that may be delivered to the compressor to provide power.

Boost from a turbocharger may be responsive to operating conditions and may be initiated to achieve acceleration. The initiation of turbocharge may be referred to as turbo boost. In systems that initiate turbo boost in response to throttle change, achieving boost requires first initiating the energy conversion capabilities of the turbine, accumulating of an amount of work, delivering accumulated work to the compressor, compressing intake aircharge, then delivering compressed air intake to the engine for combustion. The delay between throttle actuation and combustion of boosted aircharge to the engine is called turbo lag.

Turbo lag may be perceived by the operator as hesitation in the throttle response when accelerating from an idle speed. Turbo lag decreases the responsiveness of the vehicle to the operator and thus driving comfort and control.

Turbo lag may be compounded by the increased specific power demands of newer engines. Greater power demands rely on a greater volume of compressed air to be delivered to the engine during turbo boost. To compress an increased volume of air, the amount of work delivered to the compressor from the turbine must similarly increase. However, the accumulation of the increased amount of work requires time, thus more time elapses between turbo boost and throttle actuation, increasing turbo lag.

Various solutions have been devised to address increased turbo lag. For a diesel engine, the two most common approaches are to use a variable nozzle turbine (VNT) or a twin turbocharger in which one large turbocharger is used for power and one small turbocharger is used for heightened responsiveness. However, these solutions are bulky, costly and challenging to control.

Hydrogen injection has been used to improve engine performance. For instance US 20100043730, in the name of O'Bireck, describes a hydrogen generating system for an engine with a turbocharger to generate extra power during a turbo boost. O'Bireck discloses delivering the hydrogen to the fuel system for mixing with engine fuel. This, however, does not provide a means of reducing turbo lag.

The inventors found that by including a hydrogen delivery apparatus adapted to deliver hydrogen to the exhaust gas system such that the hydrogen can combust and expand, turbine speed may increase and turbo lag decrease. Further, by delivering hydrogen to the exhaust system upstream of the turbine where exhaust gas is relatively oxygen rich, the combustion of hydrogen may be assisted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 3 and FIG. 4 are example operating methods.

DETAILED DESCRIPTION

Figure 1:
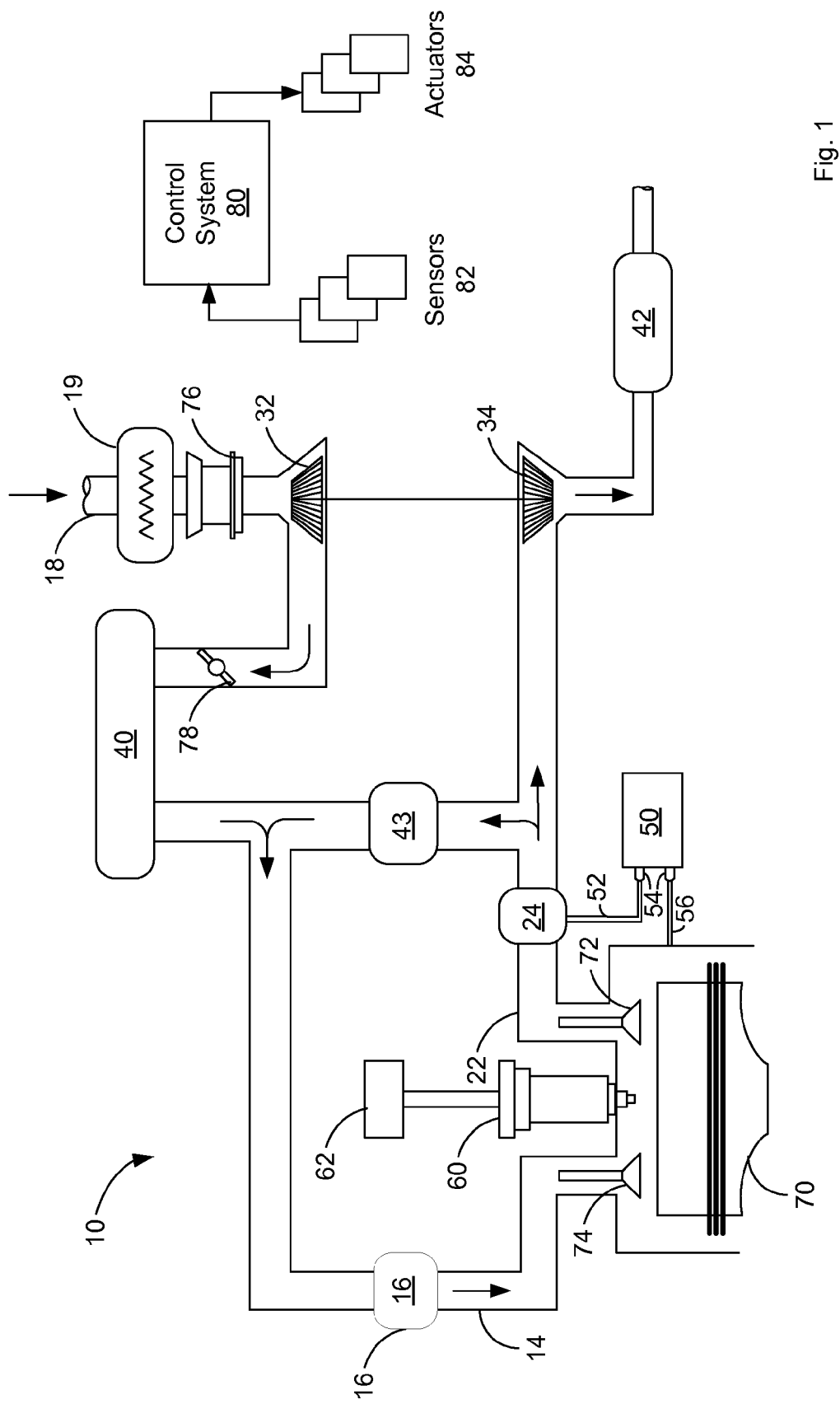
FIG. 1 is a schematic view of an engine system according to the invention.
Figure 2:
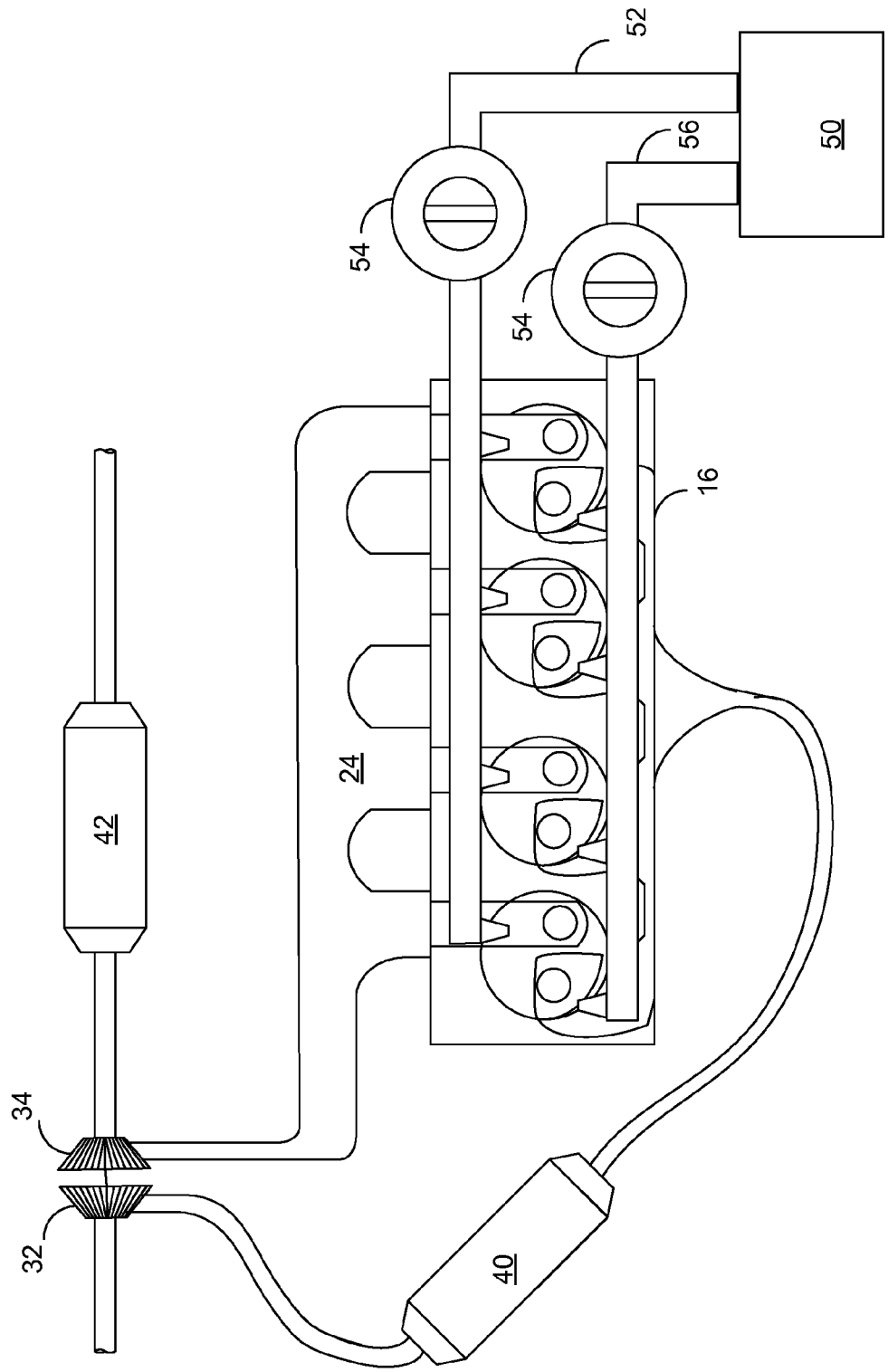
FIG. 2 is a plan view of a portion of the engine system of FIG. 1.
Figure 3:
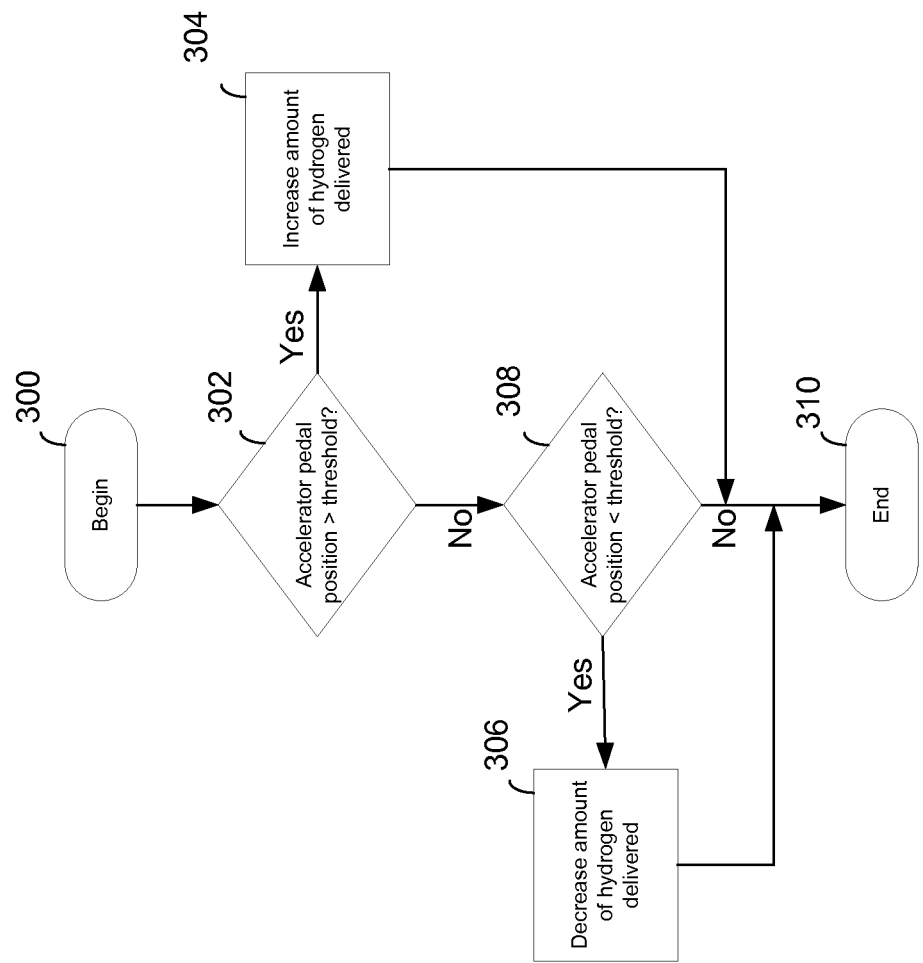

FIG. 1 schematically depicts an example embodiment of an engine system that includes EGR and a hydrogen recirculation device. FIG. 2 shows an example embodiment of a 4 cylinder in-line engine system including a hydrogen delivery apparatus. FIG. 3 diagrams an example operating method of engine operation. FIG. 4 diagrams an alternate example method of engine operation.

FIG. 1 shows one cylinder 12 of a multi-cylinder engine system 10 that may be included in the propulsion system of a vehicle. Though not shown, cylinder 12 may be part of an inline, V-shaped, or any configuration engine of any number of cylinders. Ambient air may enter the engine system via an air inlet 18. Low pressure throttle 76 may be actuated by control system 80 via actuators 84. Throttle 76 may be controlled by control system 80 via an input device actuated by a vehicle operator. The input device may include an accelerator pedal 86 and an accelerator pedal position sensor 88 that generates a proportional pedal position (PP) signal to control throttle 76. Throttle 76 may also be responsive to EGR within the intake system or EGR properties, such as fuel content, within the exhaust system. Other conditions determinative of the position of throttle 76 may be communicated to control system 80 via sensors 82.

Inlet 18 may be coupled to an air filter 19. Aircharge may pass through an air filter 19 before travelling through the compressor 32 of a turbocharger where air may be compressed and induced towards the engine cylinder 12. Compressor 32 may be a centrifugal or radial compressor receiving power from mechanically coupled turbine 34 such that compressor 32 is actuated and compresses gas in response to the rotation of the blades of turbine 34. Compressor 32 may have blades rotating about an axis in the intake system so that aircharge passing through the compressor is accelerated radially about the blades' axis of rotation. By increasing the total velocity component of intake aircharge, the kinetic energy increases. Thus, within a closed volume system, the potential energy from intake aircharge pressure increases.

The compressed intake air may then passes through an optional intercooler 40 to reduce the temperature and volume of the air before reaching an intake manifold 16. A high pressure intake throttle 78 may be positioned upstream or downstream of the intercooler 40. Throttle 78 may be actuated by sensors 82 responsive to actuators 84 via communicatively coupled control system 80. Throttle 78 may meter the amount of compressed aircharge delivered to the intake manifold. A throttle (not shown) may also be present downstream of EGR system 41 and may meter an amount of compressed aircharge and exhaust gas delivered to the engine. Cylinder 12 may receive intake air from an intake passage 14 fluidically connected to the intake manifold 16. The intake system may include mass air flow sensor and manifold pressure sensor to respectively communicate MAF and MAP signals to control system 80.

During cylinder fill, an intake valve 74 may be actuated by control system 80 to allow aircharge to enter a combustion chamber for combustion. Fuel may be injected into the combustion chamber via fuel injector 60 in what is called a direct injection system. Fuel injector 60 may be mounted near the top of combustion chamber within cylinder 12. In alternate embodiments, fuel may be injected into the aircharge in the intake system upstream of the combustion chamber. Embodiments of the disclosed engine system 10 may include an accelerator device (not shown) operable by the driver to increase the amount of fuel delivered to the engine for combustion.

Aircharge within the cylinders may ignite via a spark or compression and combust. Energy from combustion may be transmitted to a crankshaft (not shown) via mechanically coupled piston 70. The reciprocating motion of the piston may be translated into the rotational motion within the crank shaft to power the wheels. After combustion from spark or compression ignition, cylinder 12 may expel gas created during combustion into an exhaust passage 22 via exhaust valve 72. The exhaust gas removed from the cylinder 12 passes via the exhaust passage 22 to an exhaust manifold 24. In a multi-cylinder engine, exhaust gas from cylinder 12 may combine with exhaust gas from other cylinders and combustions within exhaust manifold 24.

A portion of exhaust gas may be recirculated to the intake manifold 16 via an EGR system 41. One or more EGR coolers may be present within EGR system 41, such as cooler 43. EGR flow may be throttled by an EGR throttle (not shown) within the EGR system responsive to engine conditions or exhaust gas properties. The EGR system depicted couples the exhaust system upstream of turbine 34 to the intake system downstream of compressor 32; this is called a high pressure EGR system. Other low pressure EGR systems may couple the exhaust system downstream of turbine 34 to the intake system upstream or downstream of compressor 32. Further embodiments may include both a high pressure and a low pressure EGR system.

An EGR system may include a number of valves and bypasses communicatively coupled to the control system 80 and may be responsive to engine operating conditions, intake system conditions, exhaust system conditions, exhaust gas temperature, or fuel concentration. The remaining exhaust gas may pass through and drive turbine 34 of the turbocharger.

Turbine 34, driven by the exhaust gas, may power compressor 32. Exhaust gas may then flow into the atmosphere via an exhaust gas after-treatment device 42. The turbocharger, which may include turbine 34 and compressor 32 may be embodied as a twin turbocharger, a scroll turbocharger, or a variable geometry turbocharger.

Twin turbocharger embodiments may include two turbochargers, each with an individual compressor and turbine. The respective turbochargers may operate in series or parallel and may be communicatively coupled via control system 80. Twin turbines arranged in parallel may each be fluidically coupled to separate cylinders so that they each receive a portion of exhaust gas from combustion. Alternately, they may be coupled to a single exhaust manifold that branches into dual paths upstream of the turbines such that each path is respectively coupled to the individual turbines. Series configurations may be operated by a controller with instructions to run a first turbocharger at low engine speeds and/or loads and to run a second turbocharger at high speeds and/or loads. The high speed/load turbocharger may be activated in response to surpassing a certain engine load or vehicle speed threshold.

This arrangement may help to reduce turbo lag by implementing two smaller turbochargers each more responsive to throttle position than a large turbocharger. However, two turbochargers use more undercarriage space and add more weight to the vehicle than a single turbocharger with the equivalent boost capabilities. Further, controlling two turbochargers is difficult and is not consistent over all operating conditions, resulting in less predictable engine response to acceleration and decreased driving comfort.

In other embodiments, twin-scroll turbochargers may separate exhaust gas from cylinders whose strokes mutually interfere with the expulsion of exhaust gas. Exhaust gas from interfering cylinders may be coupled to separate exhaust paths each with a nozzle disposed on the turbine. A first exhaust inlet and nozzle may have a passageway with a more restricted cross sectional area than that of a second exhaust inlet and nozzle. By restricting the flow cross-section, the velocity of flow may be increased for decreased turbo lag. The second inlet and nozzle may be configured for peak performance.

A variable-geometry turbocharger may restrict the passage of the exhaust path upstream of the turbine with a number of obstructions actuated to achieve a desired flow velocity to the turbine for the given operating conditions. The obstructions may be actuated to achieve a flow cross section by actuators communicatively coupled to control system 80 responsive to an engine load, speed, or PP.

Though each of these systems helps to reduce turbo lag, they do not eliminate it. Further, each required additional control method decreases drivability. Additional mechanical components may degrade, add additional weight to the vehicle, and expend limited under-hood space.

Thus, engine system 10 may include a hydrogen delivery apparatus which may be used with the turbocharger systems. Fuel from aircharge, exhaust, or both may be delivered to a reformer device 50 for hydrogen generation. The reformer device may be coupled to exhaust manifold 24 via a conduit 52 upstream of turbine 34. Hydrogen may be injected into the exhaust system at a point where the internal temperature within the system is at or above the autoignition temperature of hydrogen such that, upon entering the exhaust system, hydrogen may combust.

Hydrogen flow into the exhaust system may be metered by a hydrogen valve 54 as depicted in FIG. 2. Valve 54 may be within the hydrogen delivery apparatus upstream or downstream of the reformer device 50. Exhaust gas may be relatively oxygen rich in the portion of the exhaust system upstream of the turbine, aiding in the ignition and power of hydrogen combustion. The reformer device 50 may also generate oxygen and at least a portion of this can also be delivered via a conduit 56 to the exhaust manifold 24.

In some embodiments, the reformer device may be a steam reformer that, through endothermic conversion, allows fuel within aircharge or exhaust gas to interact with a catalyst. At high temperatures this interaction may form hydrogen gas as well as other bi-products such as carbon monoxide and/or oxygen gas. The hydrogen gas and additional bi-products of fuel reformation may then be delivered to the exhaust system upstream of turbine 34. The temperature of the exhaust gas at this location is typically above the autoignition temperature of the hydrogen.

The reformer device may be powered by electrical energy that may be provided, for example, by the crankshaft, an electric motor, or translated from frictional energy stored from vehicle deceleration. The engine system may be provided within a hybrid vehicle and the hydrogen delivery apparatus may be powered by electrical energy generated during deceleration of the vehicle.

As a consequence of hydrogen combustion, the exhaust gas upstream of the turbine may rapidly expand creating increased pressure within the exhaust system. Exhaust gas may thus pass through turbine 34 with increased speed and kinetic energy. This increased speed and energy increases the speed of turbine operation, consequently decreasing turbo lag.

During boost conditions, the power delivered to the compressor from the turbine is proportionally increased. Thus, in some embodiments, hydrogen delivery may be initiated during boost. Hydrogen delivery may be metered by a valve 54 within the hydrogen delivery apparatus upstream of the reformer and downstream of the fuel intake and may be actuated by a control system.

The delivered hydrogen gas may therefore combust and expand. This may occur as the gas is passing through the turbine 34 which causes an increase in the speed of the turbine 34. Consequently, the compressor 32 may be driven faster, causing an increase in the air that is delivered to the engine, reducing turbo lag.

The engine system 10 may include control system that also controls the delivery of hydrogen. The control system may include a control valve 54 for selectively allowing hydrogen to be delivered to the exhaust manifold 24. The control system may deliver hydrogen to the exhaust manifold 24 in response to operation of the accelerator device. Therefore, the hydrogen may be used to induce more air towards the engine during an acceleration event. Acceleration may be communicated to the control system via an acceleration pedal sensor.

The engine system may include a sensor adapted to measure the speed of the turbocharger and be communicatively coupled to the hydrogen delivery apparatus. Any suitable sensor may be used to determine turbocharger speed, including a MAF sensor upstream of the turbine or downstream of the compressor. The hydrogen delivery apparatus may deliver hydrogen, or increase the delivery of hydrogen, to the exhaust gas system dependent on the turbocharger speed. The reformer device may provide oxygen to the oxygen delivery apparatus.

In other embodiments, the control system may have instructions to deliver hydrogen to the exhaust manifold 24 when the turbocharger speed is low and therefore the engine speed is at or near idle speed.

Hydrogen delivery may also be metered by a valve downstream of the reformer device within conduit 52. In other embodiments, hydrogen deliver may be metered by metering the power provided to the reformer device for hydrogen generation. The reformer may be coupled and decoupled to a power source via the control system in response to certain engine events.

Hydrogen generation may also be metered by the metering the delivery of steam to the reformer device. Steam may be provided by heating a liquid such as coolant or window washer fluid by exposing it to a heater such as an engine heat exchange device, radiator, or the engine itself. Steam may be coupled and decoupled from the reformer device via a valve actuated by the control system.

The engine system 10 may be provided within a hybrid vehicle and the reformer device 50 may be powered by electrical energy generated during deceleration of the vehicle. Thus, the compressor speed may be increased without contributing to an additional load on the engine.

In some embodiments, the hydrogen delivery apparatus may deliver hydrogen to the exhaust gas system at a first location in which the exhaust gas is relatively oxygen rich to assist combustion of the hydrogen. The hydrogen delivery apparatus may deliver hydrogen to the exhaust gas system at a location in which the temperature of the exhaust gas is at or above the autoignition temperature of the hydrogen. Alternatively or additionally, the engine system may include hydrogen heating means and may include heating hydrogen prior to delivering the hydrogen to the exhaust system.

Hydrogen may be pre-heated to combustion and combust within the hydrogen delivery system. It may be contained at high pressure by a valve actuated by the control system and released at during conditions determined by the control system. Alternately, it may be pre-heated to a temperature below autoignition so that, upon entering the exhaust system, autoignition is more readily achievable. The pre-heating of hydrogen may be responsive to engine or exhaust system conditions so that, when the temperature within the exhaust system is below a threshold, preheating may be initiated. Similarly, if the exhaust system is above a threshold, preheating can be terminated. Pre-heating may also be used as a mechanism to control the combustion of hydrogen wherein pre-heating occurs in response to hydrogen delivery and combustion initiation by the control system. This may be done additionally or alternatively to a metering of hydrogen delivery via a valve within the hydrogen delivery system or another aforementioned hydrogen delivery metering method.

In alternate embodiments, hydrogen delivery systems may be coupled upstream of an EGR pipe inlet and hydrogen delivery may be responsive to EGR system demands. Combustion of hydrogen gas upstream of an EGR may increase pressure within the system and increase flow of EGR into the intake system. Hydrogen delivery may then be metered in response to engine load demands, presiding emissions, or fuel content of exhausted gas. A hydrogen delivery system may be used in congruence with a high pressure or a low pressure EGR system.

In an operating method of the hydrogen delivery system, the engine system may include an accelerator device which is operable to increase the amount of fuel delivered to the engine for combustion. The method may include initiating or increasing the delivery of hydrogen to the exhaust gas in response to operation of the accelerator device. As depicted in FIG. 3, the position of an accelerator pedal may be determined by an accelerator pedal position sensor at 302. If the pedal is actuated to a threshold, which may correspond with the activation point of a turbocharger, the delivery of hydrogen into the exhaust system may be increased at 304. If the accelerator pedal is not actuated to a threshold, it may be determined if the accelerator pedal is actuated below a minimum threshold at 306 that may correspond to the deactivation of a turbocharger. If it is below this threshold, the amount of hydrogen delivered to the exhaust system may be decreased at 308.

An alternate method depicted in FIG. 4 may include measuring the speed of the turbocharger and delivering hydrogen, or increasing the delivery of hydrogen, to the exhaust system dependent on turbocharger speed. Turbocharger speed may be determined by sensors within the intake and exhaust system that may include MAF sensors. The speed of a turbocharger may be determined at 402. If turbocharger speed is above a threshold, the delivery of hydrogen into the exhaust system may be increased at 404. If turbocharger speed is below a threshold at 406, the amount of hydrogen delivered to the exhaust system may be decreased at 408.

In other embodiments, hydrogen delivery may be activated in response to the turbocharger and/or engine is operation below a speed, drive, or load threshold that may be close to idle. Thus, hydrogen delivery may be initiated under conditions in which turbo lag is high.

Note that the example control and estimation routines included herein can be used with various engine and/or vehicle system configurations. Further, this technology can be applied to any type of powertrain including, but not limited to, powertrains associated with pure electric, hybrid electric, plug-in hybrid electric, fuel cell electric, and diesel engine powered vehicles. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An engine system comprising:
an exhaust system;
a turbocharger comprising a compressor powered by a turbine within the exhaust system; and
a hydrogen delivery apparatus with an inlet coupled to engine cylinders and an outlet coupled to the exhaust system, wherein the engine system is adapted to power a hybrid vehicle and the hydrogen delivery apparatus receives electrical energy generated during deceleration of the vehicle.

2. The engine system of claim 1, wherein the hydrogen delivery apparatus is coupled to the exhaust system upstream of the turbine.

3. The engine system of claim 1, wherein the hydrogen delivery apparatus is coupled to the exhaust system at a location in which a temperature of the exhaust gas is at or above autoignition temperature of the hydrogen.

4. The engine system of claim 1, further including a hydrogen heating device.

5. The engine system of claim 1, wherein the exhaust system includes an exhaust manifold and wherein the hydrogen delivery apparatus is coupled to the exhaust manifold.

6. The engine system of claim 1, wherein the hydrogen delivery apparatus includes a reformer device.

7. The engine system of claim 1, further including an accelerator device which is operable to increase an amount of fuel delivered to an engine of the engine system for combustion, and wherein the hydrogen delivery apparatus is controlled by a control system with instructions to deliver hydrogen, or to increase the delivery of hydrogen, to the exhaust system in response to operation of the accelerator device.

8. The engine system of claim 1, further including a sensor that is adapted to measure the speed of the turbocharger and is communicatively coupled to the hydrogen delivery apparatus, wherein the hydrogen delivery apparatus is controlled by a control system with instructions to initiate or to increase the delivery of hydrogen to the exhaust system in response to an operating speed of the turbocharger.

9. The engine system of claim 1, wherein the hydrogen delivery apparatus is coupled to the exhaust system at a first location in which the exhaust gas is relatively oxygen rich with respect to other locations within the exhaust system.

10. The engine system of claim 9, wherein the hydrogen delivery apparatus includes an oxygen delivery apparatus coupled to the exhaust system at the first location.

11. A method of operating an engine system with an exhaust system, comprising:
turbo-charging an engine with a turbocharger that includes a compressor and a turbine;
compressing air within the compressor, inducing air towards the engine, and powering the compressor with the turbine;
driving the turbine using removed exhaust gas;
delivering hydrogen to the exhaust gas upstream of the turbine;
increasing a speed of turbine rotation by combusting hydrogen;
generating hydrogen using a reformer device; and
powering the reformer device using electrical energy generated during deceleration of a vehicle.

12. The method of claim 11, further including delivering hydrogen to the exhaust system at a location in which the exhaust gas is at or above an autoignition temperature of hydrogen.

13. The method of claim 11, further including heating the hydrogen prior to delivering the hydrogen to the exhaust system.

14. The method of claim 11, further including increasing an amount of fuel delivered to the engine for combustion in response to actuation of an accelerator device and initiating or increasing hydrogen delivery to the exhaust system in response to actuation of the accelerator device.

15. The method of claim 11, further including measuring an operation speed of the turbocharger and initiating or increasing an amount of hydrogen delivery to the exhaust system in response to operation speed of the turbocharger.

16. The method of claim 11, further including delivering hydrogen to the exhaust system at a first location in which exhaust gas is relatively oxygen rich.

17. The method of claim 16, further including delivering oxygen to the exhaust system at the first location.

* * * * *